(12) United States Patent
Day et al.

(10) Patent No.: US 8,663,791 B2
(45) Date of Patent: *Mar. 4, 2014

(54) COMPOSITE REINFORCED CORES AND PANELS

(75) Inventors: Stephen W. Day, Centerville, OH (US); Michael S. Sheppard, Centerville, OH (US); John P. Jones, Franklin, OH (US); Thomas John Ewry, Trotwood, OH (US); Danny E. Tilton, Dayton, OH (US); Frederick Stoll, West Chester, OH (US)

(73) Assignee: Milliken & Company, Spartanburg, SC (US)

( * ) Notice: Subject to any disclaimer, the term of this patent is extended or adjusted under 35 U.S.C. 154(b) by 132 days.

This patent is subject to a terminal disclaimer.

(21) Appl. No.: 13/066,002

(22) Filed: Apr. 4, 2011

(65) Prior Publication Data

US 2012/0251814 A1   Oct. 4, 2012

(51) Int. Cl.
  *B32B 5/22* (2006.01)
  *B32B 3/28* (2006.01)
(52) U.S. Cl.
  USPC ............... 428/309.9; 428/316.6; 428/317.1; 428/172; 428/181; 52/790.1; 52/793.11
(58) Field of Classification Search
  USPC ............. 428/316.6, 309.9, 172, 181, 317.1; 52/790.1, 793.11
  See application file for complete search history.

(56) References Cited

U.S. PATENT DOCUMENTS

| 2,053,173 A | 9/1936 | Astima ........................... 88/24 |
| 2,062,590 A | 12/1936 | Lundquist ...................... 41/23 |
| 2,493,032 A | 1/1950 | Rheinfrank, Jr. ............. 154/125 |
| 3,192,099 A | 6/1965 | Beckman et al. ................ 161/43 |
| 3,230,995 A | 1/1966 | Shannon ........................ 156/166 |
| 3,243,492 A | 3/1966 | Voelker ......................... 264/346 |
| 3,246,058 A | 4/1966 | Voelker ........................... 264/47 |

(Continued)

FOREIGN PATENT DOCUMENTS

| CA | 446910 | 2/1948 |
| CA | 658023 | 2/1963 |

(Continued)

OTHER PUBLICATIONS

Patent Cooperation Treaty—International Search Report. Date of Mailing, May 11, 2012. International Application No. PCT/US2012/027992, International Filing Date Mar. 7, 2012 (Jul. 3, 2012).

*Primary Examiner* — Hai Vo
(74) *Attorney, Agent, or Firm* — Cheryl J. Brickey

(57) ABSTRACT

A composite core panel is produced by arranging a plurality of foam strips in adjacent relation and advancing the strips with one or two flexible sheets of porous reinforcement material and adhesive between platens to form a panel. The sheet on one side of the strips is folded between adjacent strips to form double wall pleats which may project either partially or fully between the strips and may have folded end portions overlying the other side of the strips. The second sheet may also form double wall pleats between the strips and be connected to the pleats in the first sheet. The core panel may be cut to form reinforced strips which are connected by adhesive in various arrangements to form other core panels. A core panel may also be formed by wrapping each foam strip longitudinally with a strip of reinforcing material and connecting the strips with adhesive.

8 Claims, 7 Drawing Sheets

(56) References Cited

U.S. PATENT DOCUMENTS

| | | | |
|---|---|---|---|
| 3,264,153 A | 8/1966 | Rodman et al. | 156/79 |
| 3,298,892 A | 1/1967 | Lippay | 161/38 |
| 3,339,326 A | 9/1967 | Derr et al. | 52/309 |
| 3,472,728 A | 10/1969 | Hitch | 161/69 |
| 3,526,556 A | 9/1970 | Berner | 156/79 |
| 3,544,417 A | 12/1970 | Corzine | 161/50 |
| 3,549,449 A | 12/1970 | Windecker | 156/254 |
| 3,567,541 A | 3/1971 | Kaczerginski | 156/172 |
| 3,697,633 A | 10/1972 | Edgar | 264/45 |
| 3,708,385 A | 1/1973 | Immethun | 161/69 |
| 3,733,235 A | 5/1973 | Light et al. | 156/260 |
| 3,734,811 A | 5/1973 | Small et al. | 161/37 |
| 3,750,355 A | 8/1973 | Blum | 52/309 |
| 3,841,958 A | 10/1974 | Delorme | 161/161 |
| 3,867,238 A | 2/1975 | Johannsen | 161/37 |
| 3,906,137 A | 9/1975 | Bauer | 428/315 |
| 4,042,746 A | 8/1977 | Hofer | 428/311 |
| 4,048,365 A | 9/1977 | Hoover | 428/215 |
| 4,093,762 A | 6/1978 | Kiefer | 428/55 |
| 4,119,750 A | 10/1978 | Porter | 428/105 |
| 4,179,540 A | 12/1979 | Smarook | 428/71 |
| 4,196,251 A | 4/1980 | Windecker | 428/71 |
| 4,223,053 A | 9/1980 | Brogan | 428/35 |
| 4,262,052 A | 4/1981 | Kannan et al. | 428/306 |
| 4,292,369 A | 9/1981 | Ohaski et al. | 428/313 |
| 4,330,494 A | 5/1982 | Iwata et al. | 264/46.2 |
| 4,361,613 A | 11/1982 | Bogner et al. | 428/119 |
| 4,380,253 A | 4/1983 | Mead et al. | 138/149 |
| 4,411,939 A | 10/1983 | Hawkins et al. | 428/58 |
| 4,412,880 A | 11/1983 | Wintermantel | 156/156 |
| 4,498,941 A | 2/1985 | Goldsworthy | 156/148 |
| 4,521,266 A | 6/1985 | Careddu | 156/242 |
| 4,536,427 A | 8/1985 | Kohn | 428/44 |
| 4,608,103 A | 8/1986 | Aldrich | 156/64 |
| 4,617,217 A | 10/1986 | Michaud-Soret | 428/71 |
| 4,670,338 A | 6/1987 | Clemino | 428/312.6 |
| 4,687,691 A | 8/1987 | Kay | 428/73 |
| 4,807,969 A | 2/1989 | Shimodaira et al. | 350/320 |
| 4,808,461 A | 2/1989 | Boyce et al. | 428/119 |
| 4,823,534 A | 4/1989 | Hebinck | 52/743 |
| 5,039,567 A | 8/1991 | Landi et al. | 156/148 |
| 5,060,291 A | 10/1991 | Albertelli | 428/306.6 |
| 5,087,500 A | 2/1992 | Kasper et al. | 428/116 |
| 5,108,810 A | 4/1992 | Williams | 428/36.1 |
| 5,182,150 A | 1/1993 | Carlos et al. | 428/35.7 |
| 5,186,776 A | 2/1993 | Boyce et al. | 156/73.2 |
| 5,197,928 A | 3/1993 | Mishima et al. | 474/263 |
| 5,234,969 A | 8/1993 | Clark et al. | 521/181 |
| 5,237,737 A | 8/1993 | Zigler et al. | 29/598 |
| 5,462,623 A | 10/1995 | Day | 156/250 |
| 5,466,506 A | 11/1995 | Freitas et al. | 428/105 |
| 5,589,015 A | 12/1996 | Fusco et al. | 156/73.1 |
| 5,589,243 A | 12/1996 | Day | 428/56 |
| 5,624,622 A | 4/1997 | Boyce et al. | 264/258 |
| 5,625,999 A | 5/1997 | Buzza et al. | 52/793.11 |
| 5,721,034 A | 2/1998 | Seemann, III et al. | 428/71 |
| 5,741,574 A | 4/1998 | Boyce et al. | 428/119 |
| 5,794,402 A | 8/1998 | Dumlao et al. | 52/783.17 |
| 5,834,082 A | 11/1998 | Day | 428/56 |
| 5,904,972 A | 5/1999 | Tunis, III et al. | 428/178 |
| 5,958,325 A | 9/1999 | Seemann, III et al. | 264/510 |
| 6,159,414 A | 12/2000 | Tunis, III et al. | 264/510 |
| 6,191,414 B1 | 2/2001 | Ogle et al. | 250/227 |
| 6,655,633 B1 | 12/2003 | Chapman | 244/123 |
| 6,676,785 B2 | 1/2004 | Johnson et al. | 156/92 |
| 6,740,381 B2 | 5/2004 | Day et al. | |
| 6,824,851 B1 | 11/2004 | Locher et al. | 428/76 |
| 7,056,567 B2 | 6/2006 | O'Neill et al. | 428/71 |
| 7,393,577 B2 | 7/2008 | Day et al. | |
| 2004/0247856 A1 | 12/2004 | Sikorski et al. | 428/318.4 |
| 2005/0019549 A1 | 1/2005 | Tai et al. | 428/315.9 |
| 2011/0081514 A1* | 4/2011 | Day et al. | 428/53 |

FOREIGN PATENT DOCUMENTS

| | | |
|---|---|---|
| CA | 2 725 735 | 12/2009 |
| CA | 2725735 | 12/2009 |
| DE | 1951310 | 4/1970 |
| DE | 1949209 | 4/1971 |
| DE | 2236479 | 2/1974 |
| DE | 19715529 | 8/1998 |
| EP | 0 293 612 | 7/1988 |
| EP | 0 569 846 | 11/1993 |
| FR | 1 596 868 | 6/1970 |
| GB | 245458 | 5/1926 |
| GB | 548027 | 9/1942 |
| GB | 0 559 527 | 2/1944 |
| GB | 1 265 835 | 3/1972 |
| GB | 1 375 877 | 11/1974 |
| GB | 2 253 588 | 9/1992 |
| GB | 0 672 805 | 9/1995 |

* cited by examiner

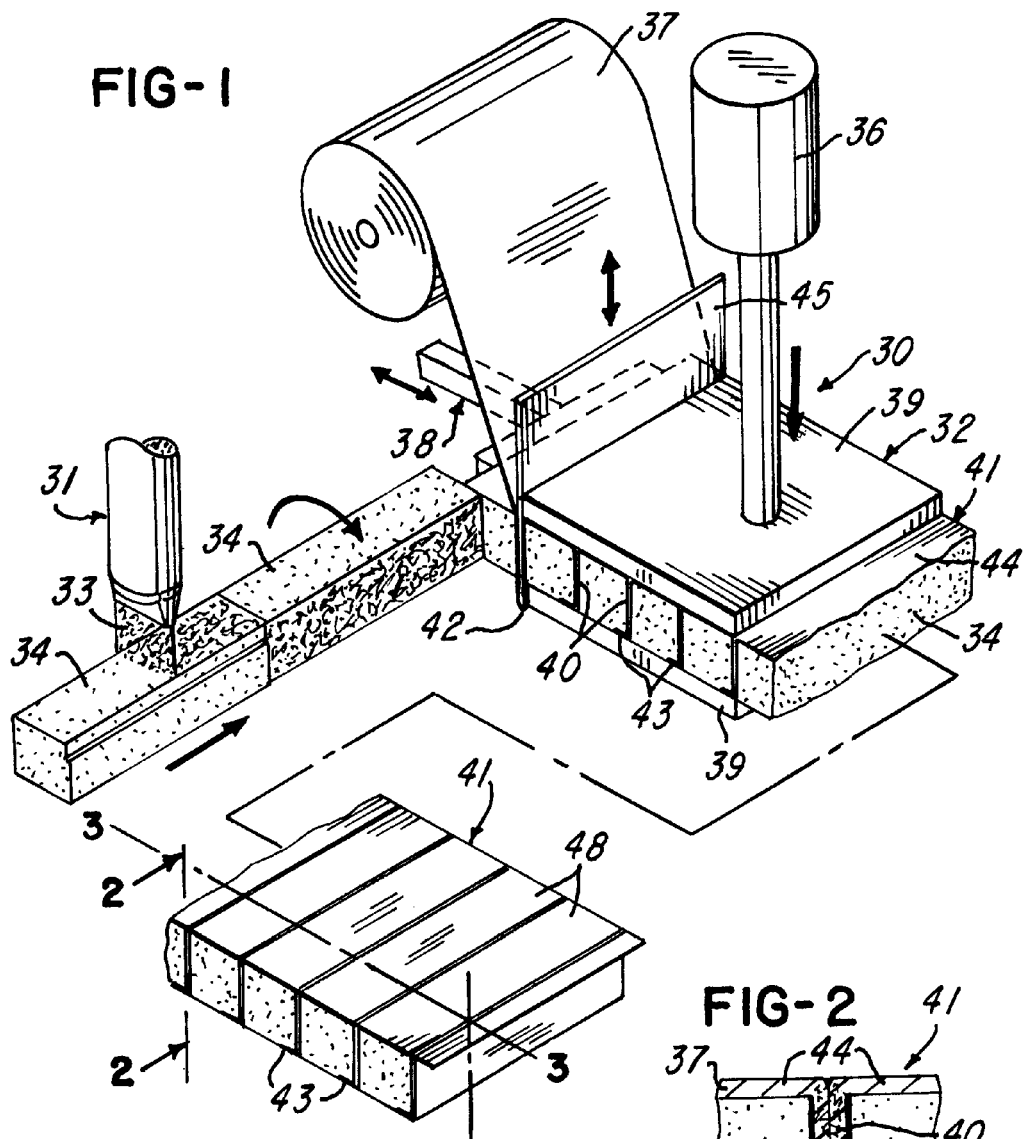
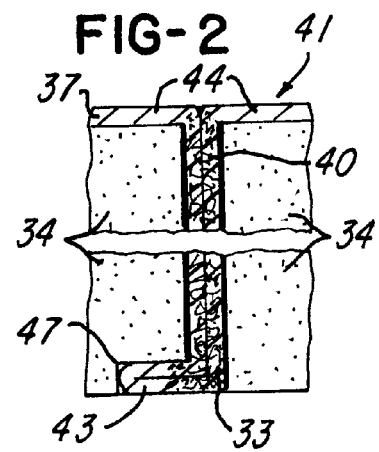
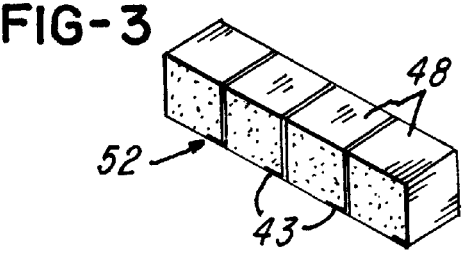

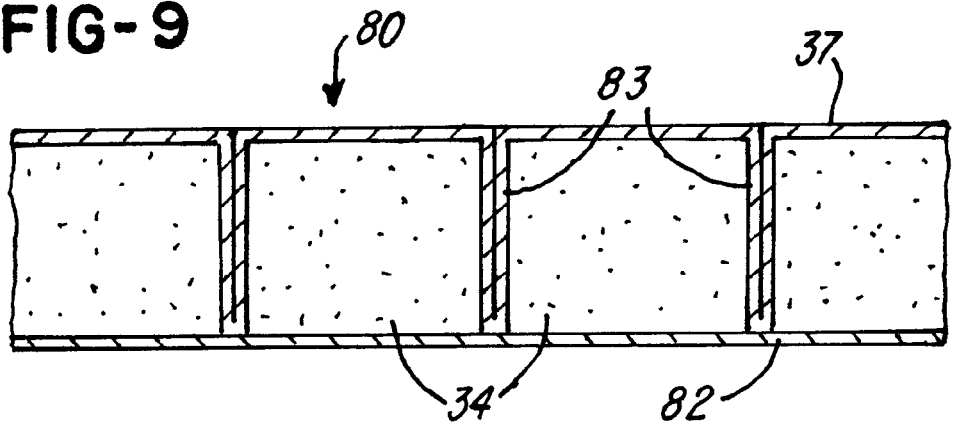
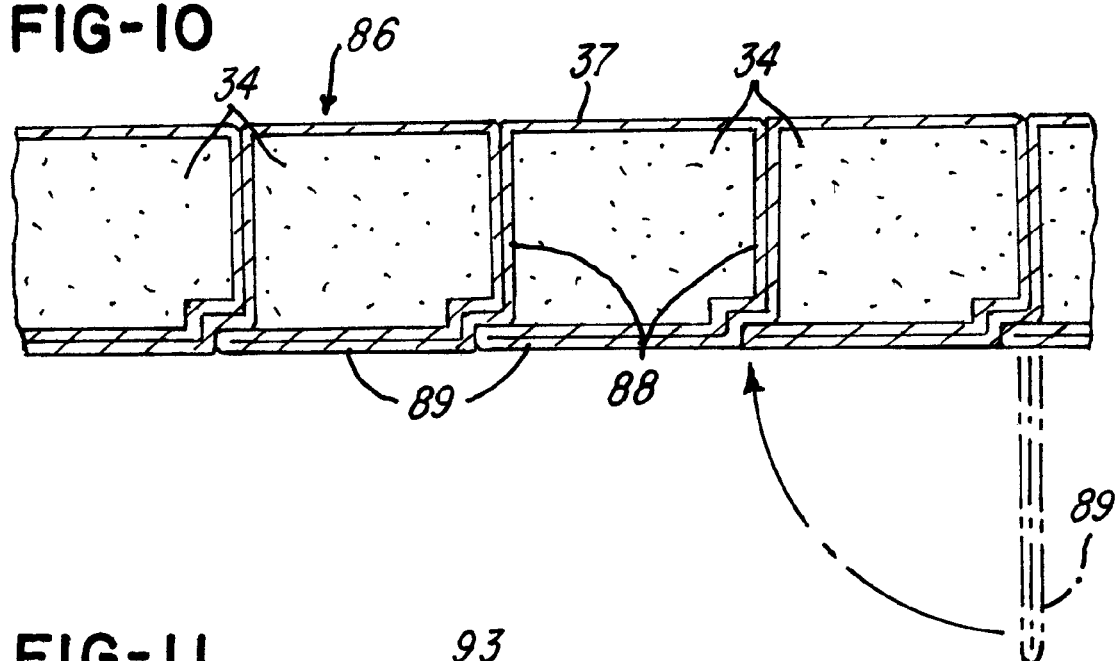
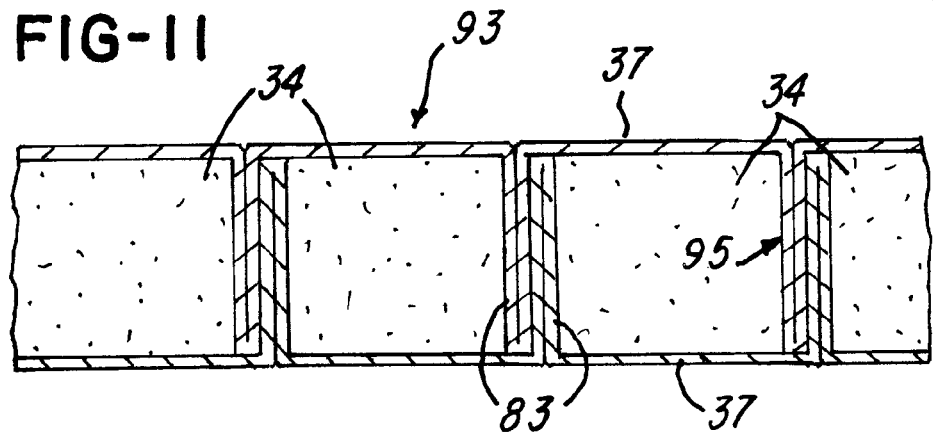

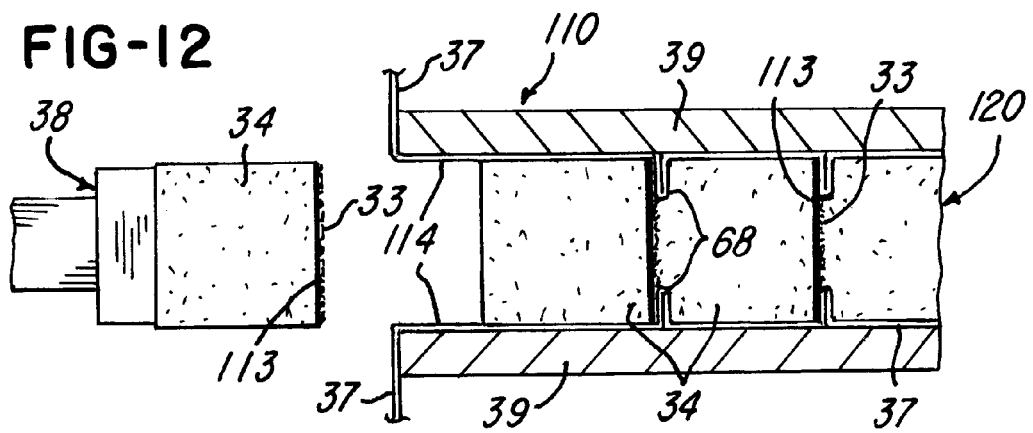
FIG-12
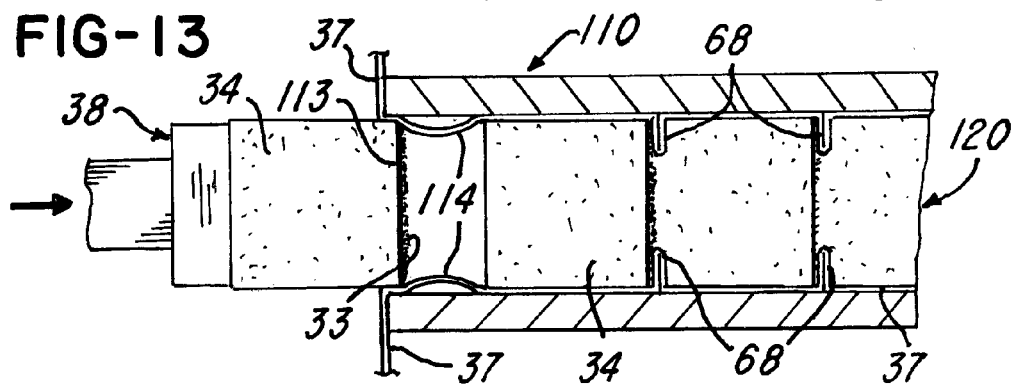
FIG-13
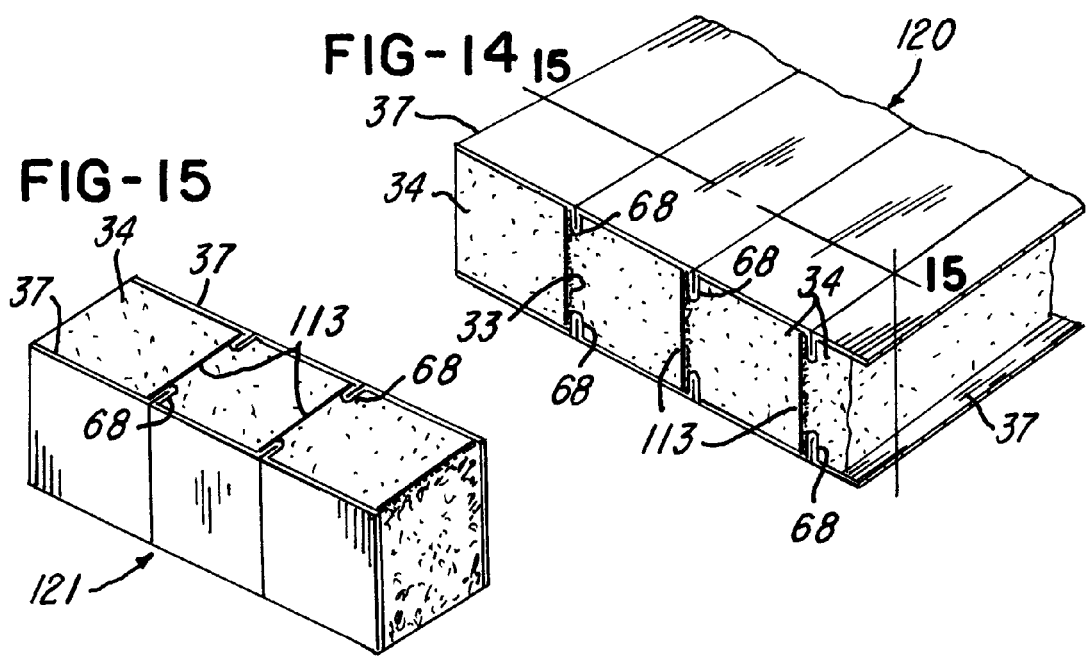
FIG-14
FIG-15

COMPOSITE REINFORCED CORES AND PANELS

FIELD OF THE INVENTION

This invention relates to composite sandwich panels comprising rigid skin materials separated by and bonded to generally lower density core materials. More specifically, the invention relates to core panels comprising a plurality of strips or blocks of low density cellular material and having fibrous reinforcing members which extend between the faces of the core panel, as well as methods and apparatus of production.

BACKGROUND OF THE INVENTION

Composite sandwich panels are widely used in applications which require engineered structural properties and light weight. A prominent example, among many, is the blades of wind turbines used to produce electrical energy. These blades commonly comprise skins of fibrous reinforcements, for example fiberglass fabric, saturated with hardened resin, for example epoxy or polyester. The skins are bonded to cellular core materials, for example balsa wood, plastics foam or composite core materials. In addition to fiber reinforced resins, sandwich panel skins may comprise a wide variety of other stiff materials, for example aluminum, steel or plywood. Examples of composite core materials are disclosed in U.S. Pat. No. 6,740,381 and U.S. Pat. No. 7,393,577 which issued to the assignee of the present invention and the disclosures of which are herein incorporated by reference.

SUMMARY OF THE INVENTION

The composite core materials, or core panels, which are the subject of the present invention comprise improved strips or blocks of low density cellular material of relatively low structural properties and weight, separated by reinforcing materials in the form of pleats having relatively high structural properties, and the reinforcing materials including the pleats extend between the faces or side surfaces of the core panel and are adhesively bonded to the skins of the sandwich panel.

A particular advantage of the improved composite core panels produced in accordance with the invention, is that they may be designed and manufactured to provide strength and stiffness properties which closely match optimum desired properties determined by engineering analysis for a given sandwich panel structure, which often including structural properties which differ in the longitudinal and transverse dimensions of the core. By contrast, traditional core materials such as balsa wood and non-reinforced plastics foam have isotropic structural properties, that is, their properties are the same in both the length and width directions of the core. Thus, balsa wood or foam cores must be specified in the maximum density required to resist the highest directional stresses in the core, often increasing both the weight and cost of the core.

The present invention includes new and useful forms of composite core panels and improved methods and apparatus of production. Other features and advantages of the invention will be apparent from the following description, the accompanying drawings and the appended claims.

BRIEF DESCRIPTION OF THE DRAWINGS

FIG. 1 is a diagrammatic view of apparatus for producing a composite core panel in accordance with the invention, with the core panel shown in perspective;

FIG. 2 is an enlarged fragmentary section of the core panel as taken generally on the line 2-2 of FIG. 1;

FIG. 3 is a perspective view of a strip cut along the line 3-3 from the core panel shown in FIG. 1;

FIG. 9 is a fragmentary section of another core panel constructed with the apparatus of FIG. 1 in accordance with the invention;

FIG. 10 is a fragmentary section of another core panel constructed with the apparatus of FIG. 1 in accordance with the invention;

FIG. 11 is a fragmentary section of another core panel constructed in accordance with the invention;

FIG. 12 is a fragmentary section of apparatus for producing a composite core panel in accordance with the invention;

FIG. 13 is a section similar to FIG. 12 and showing the apparatus forming a core panel in accordance with the invention;

FIG. 14 is a fragmentary perspective view of a core panel produced on the apparatus shown in FIGS. 12 and 13;

FIG. 15 is a fragmentary perspective view of a strip cut from the core panel shown in FIG. 14 generally on the line 15-15 of FIG. 14;

DESCRIPTION OF THE ILLUSTRATED EMBODIMENTS

Figure 4:
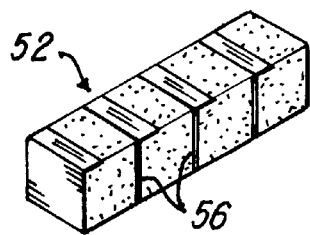
FIG. 4 is a perspective view of the strip shown in FIG. 3 and inverted.

Referring to FIG. 1, core panel production apparatus 30 includes hardenable adhesive resin application module 31 and resin cure module 32. Adhesive resin 33 is applied to strips 34 of low density cellular material, for example balsa wood, plastics foam, or fiber reinforced composite foam. Resin 33 may be a crosslinking thermoset variety, for example polyester, epoxy or phenolic, or a heat activated thermoplastic variety, for example polypropylene or PET. Strips 34 may be or rectangular, trapezoidal, triangular or other cross sectional shape, including strips having edges of concave and/or convex curvature.

Strips 34 are advanced sequentially and progressively into resin cure module 32, and a continuous sheet reinforcing material 37, for example porous fiberglass mat, is extended and folded to form double wall pleats 40 between opposing faces of strips 34 prior to being advanced by reciprocating ram 38 or other means between spaced press platens or plates 39 of resin cure module 32. Material or mat insertion pleating may be by a reciprocating tucker blade 45 or other means. During the mat pleating process, pleated portions of mat 37 may be extended either partially or fully through the thickness of core panel 41 to form projected end portions of the pleats. If desired, the pleated end portions 42 may extend beyond the opposite face or side surface of core panel 41 as shown in FIG. 1, and as foam strips 34 advance between press platens 39, the extended portions 42 are folded backward to form folded two-layer reinforcing flanges or tabs 43 adjacent the surface of core panel 41 to provide an expanded area of adhesive attachment of mat 37 to sandwich panel skins.

On the opposite face or side surface of core panel 41, single Mayer portions 44 of reinforcing mat 37 cover the surfaces of foam strips 34 to provide strong attachment to sandwich panel skins. Adhesive resin 33 hardens as strips 34 and reinforcing material 37 advance through resin cure module 32, and the finished composite core panel 41 emerges continuously from the production apparatus. The adhesive hardening and bonding process may be facilitated by the application of heat, cold and/or pressure to the faces or side surfaces of core panel 41 as applied by a fluid cylinder 36, as the panel advances through resin cure module 32.

In a variation of the process shown in FIG. 1, adhesive application module 31 is omitted and heat activated adhesive, for example EVA, polyamide or polyester is provided on one or both faces of reinforcing mat 37. As foam strips 34 and pleated mat 37 advance through resin cure module 32, heat is applied to soften the adhesive and bond strips and mat together to form the continuous core panel 41. Platens 39 may be parallel, as shown in FIG. 1, for producing core panels having uniform transverse cross section, or they may be non-parallel, for producing cores having non-uniform cross section. When cores have non-uniform transverse cross section, strips 34 are of corresponding transverse cross section. The production apparatus shown in FIGS. 12, 13, 19 and 20 may be similarly provided with non-parallel platens.

FIG. 2 is an enlarged view of a fragmentary section of core panel 41, showing folded web portions or double wall pleats 40 and folded flange or end portions 43 of the pleats formed from the continuous reinforcing mat 37. Preferably foam strips 34 are provided with recesses 47 into which flanges or end portions 43 fold, in order to provide a flush surface to the core panel. Recesses 47 may be of other configurations, for example, bevels on one or both of opposing strips 34, to which flange or end portions 43 conform, for providing the web formed by the pleats 40 with and expanded area of skin contact. As described in connection with FIG. 1, pleats 40 are impregnated with resin 33, which may be applied in sufficient quantity to fully or only partially saturate the pleats 40, as desired. Portions 44 of mat 37 adjacent the faces or side surfaces of core panel 41 may be free of resin 33 and are adapted for impregnation with resin used for attachment of sandwich panel skins (not shown). All of the core panel embodiments of the present invention may, if desired, comprise fibrous reinforcing materials which are fully or only partially saturated with hardened adhesive resin, or which are saturated with partially cured, or B-stage, resin.

Sheet or mat 37 may be provided with one or more layers of reinforcing rovings, arranged in parallel rows and attached to mat 37 by adhesive or stitching, to provide the core panel with enhanced structural properties. These roving layers may comprise stitched or woven reinforcing fabric commonly used in the fiber reinforced composite industry. Layers of roving which cross at acute angles relative to the length of mat 37 are especially effective in providing enhanced shear strength to the core panel. It is also within the scope of the present invention to substitute stitched or woven fabrics comprising reinforcing rovings for mat 37.

Core panel 41 shown in FIGS. 1 and 2 is predominantly unidirectional in structural properties, since all reinforcing webs or pleats 40, comprising double wall pleated portions of mat 37, extend through the core panel in parallel rows. If it is desired to provide a core panel with improved bi-directional properties, core panel 41 may be cut as shown into a plurality of reinforced core strips 52 as illustrated in FIG. 3 and shown in inverted position in FIG. 4. Core strips 52 may then be substituted for foam strips 34 and advanced in inverted position through core panel production apparatus 30 as previously described in connection with FIG. 1 and generally illustrated in FIG. 5, to produce bi-directional core panel 55 having longitudinal reinforcing webs or double wall pleats 56 and transverse reinforcing webs or double wall pleats 57. Many other forms of reinforced core panel strips may be substituted for reinforced strips 52, for example helically wound strips 63 of rovings, as shown in FIG. 6, and mat-reinforced strips cut from core panels shown in FIGS. 9-11, 14 and 16.

Prior to insertion into a core panel production, reinforced foam strips 34 may be rotated to orient their reinforcements to achieve desired structural properties. Referring again to FIG. 5, opposing faces or opposite side surfaces of core panel 55 are covered by both single-layer portions 48 and double wall flange portions or flanges 43 of reinforcing mat 37. The reinforcing mat 37 extends continuously on opposite side surfaces of core panel 55 and through the panel as structural webs or pleats 57. If each core strip 52 as shown in FIG. 3 is not inverted as shown in FIG. 4, in producing core panel 55, a double layer of continuous reinforcing mat 37 continuously covers one of the side surfaces of the bi-directional core panel. This construction is particularly useful in resisting puncture loads perpendicular to the side surface of the core panel.

Figure 5:
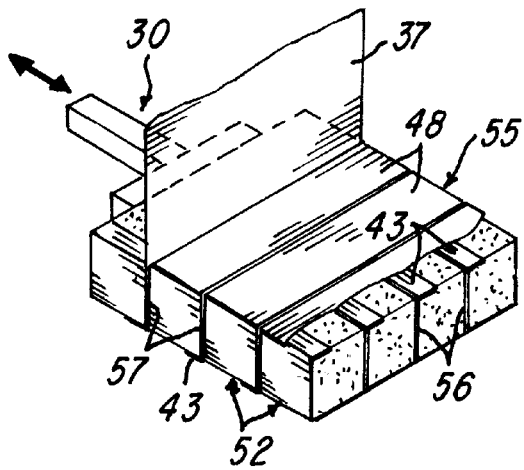
FIG. 5 is a diagrammatic view illustrating the production of a core panel using strips shown in FIG. 4.
Figure 6:
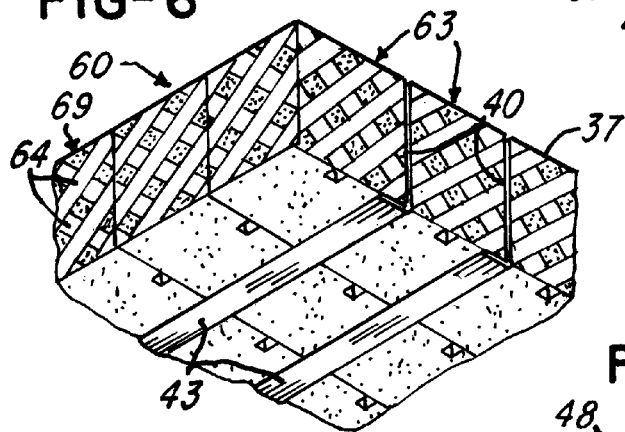
FIG. 6 is a fragmentary perspective view of another core panel constructed with the apparatus as FIG. 1 in accordance with the invention.
Figure 18:
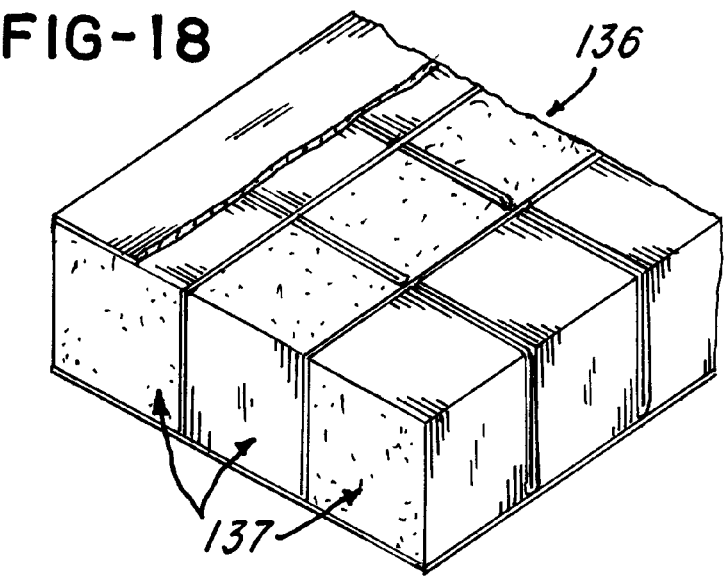
FIG. 18 is a fragmentary perspective view of another core panel constructed in accordance with the invention.
Figure 22:
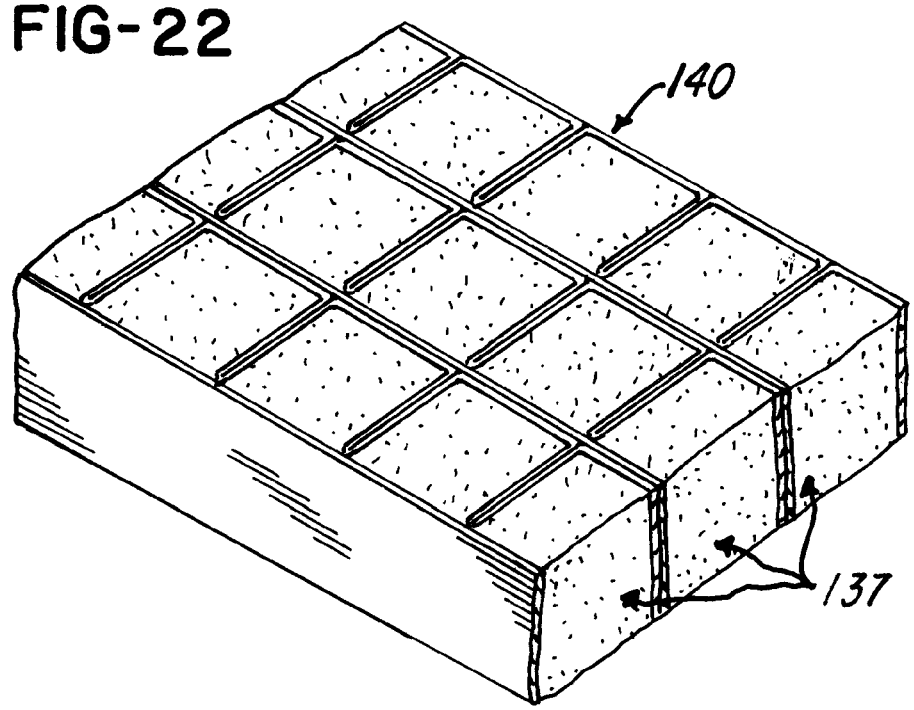
FIG. 22 is a fragmentary perspective view of another core panel produced in accordance with the invention.
Figure 23:
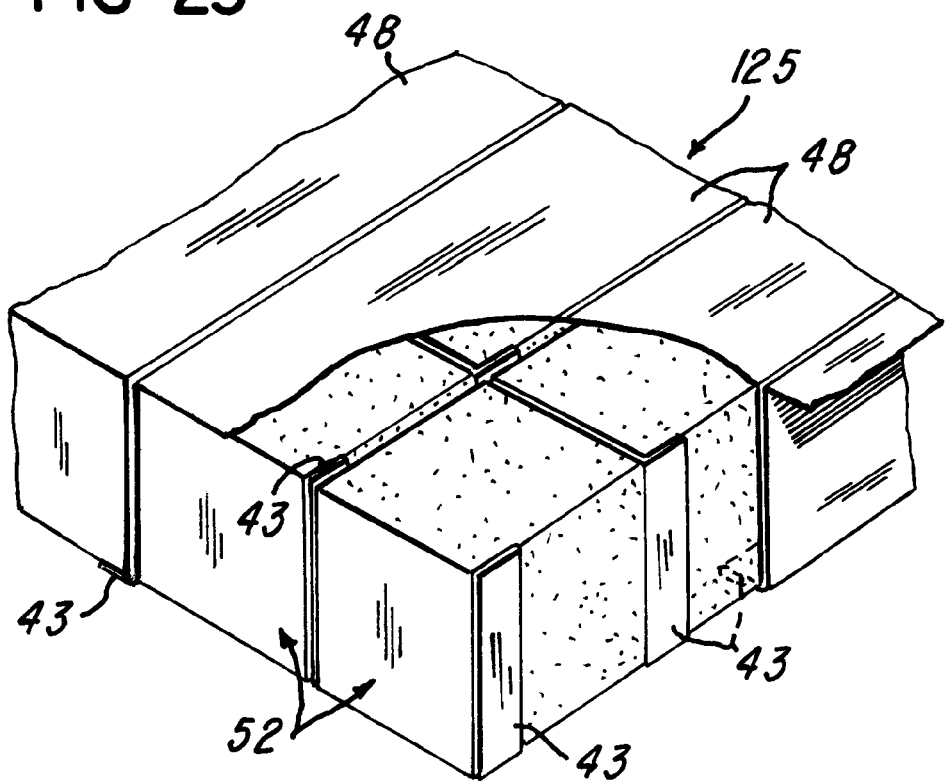
FIG. 23 is a fragmentary perspective view of another core panel produced in accordance with the invention.

Referring to FIG. 23, core strip 52 may also be rotated ninety degrees from its orientation shown in FIG. 5 to produce bi-directional core panel 125 having enhanced compressive and transverse shear strength. In rotated orientation, portions 48 and 43 which overlie opposite side surfaces of core strip 52 so that they extend between opposite faces or side surfaces of core panel 125 as additional internal reinforcing webs. FIGS. 5 and 23, as well as FIGS. 18 and 22, illustrate the flexibility of the present invention to provide a variety of specific desired structural properties by changing the orientation of the component strips which comprise the core panel. The compressive and transverse shear strengths of core panel 55 shown in FIG. 5 and core panel 125 shown in FIG. 23 are markedly different.

Similarly, FIG. 18 illustrates core panel 136 in which alternating strips 137 cut from core panel 80 shown in FIG. 9, are rotated ninety degrees to provide a balance of bi-directional core properties and skin-to-core attachment. FIG. 22 illustrates core panel 140 which is also comprised of strips 137 cut from core panel 80, but without rotation of alternate strips 137, and in which all reinforcements terminate at the faces or opposite side surfaces of core panel 140. This embodiment is useful in applications requiring high compressive strength and lesser skin attachment strength.

FIG. 6 illustrates an embodiment of the invention which provides bi-directional strength and stiffness after only a single pass through production apparatus 30. Bi-directional core panel 60 is produced by substituting reinforced foam strips 63 for the non-reinforced foam strips 34 shown in FIG. 1. Strips 63 comprise strips of adhesively connected blocks of plastics foam, with each block helically surrounded by layers of fibrous reinforcing crossing rovings 64, as described in connection with FIG. 22 of above-mentioned U.S. Pat. No. 7,393,577. Crossing rovings 64 provide structural properties in both longitudinal and transverse directions. Fibrous mat 37 and pleats 40 with flanges 43 provide enhanced structural connection of core panel 60 to sandwich panel skins, and mat 37 and pleats 40 also enhance the transverse properties of core panel 60.

Figure 7:
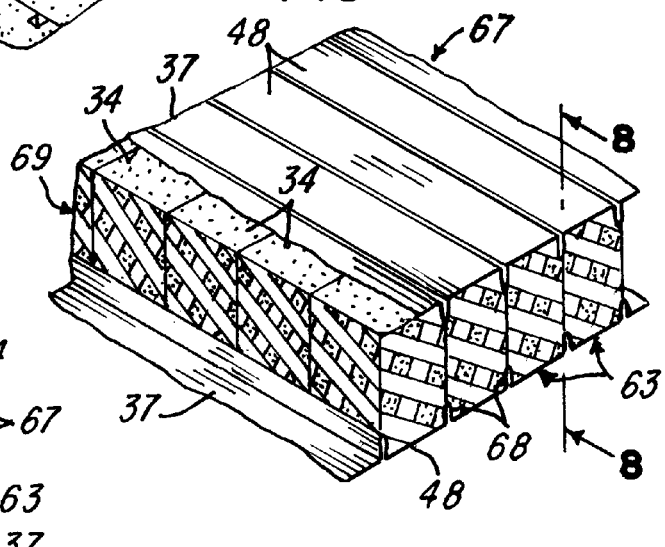
FIG. 7 is a fragmentary perspective of another core panel constructed with the apparatus of FIG. 1 in accordance with the invention.

FIG. 7 shows another embodiment of the invention and which provides enhanced structural attachment to sandwich panel skins. Core panel 67 comprises reinforced foam strips 63 and continuous fibrous mats 37 forming opposite side surfaces of the panel. Layers 69 of helically wound fibrous reinforcements, for example fiberglass rovings, extend around foam blocks 34, and the edges of layers 69 terminate adjacent opposite faces or surfaces of strips 63. Porous and flexible fiberglass mats 37 are adhesively connected to opposite faces of the core panel 67. Portions of mats 37 form double wall pleats 68 which extend between opposing faces of strips 63 and partially through the thickness of the core panel, as shown in enlarged detail in FIG. 8. Preferably, opposing faces of pleats 68 are adhesively connected to each other, with sufficient temporary bonding to maintain rigidity of the core panel during handling. When the core panel 67 is molded between sandwich panel skins (not shown), the molding resin impregnates the pleats 68 and the non-pleated portions 48 to provide an enhanced structural bond to sandwich panel skins. Pleats 68 may be provided on either one or both faces of core panel 67 as required by structural or handling considerations.

The enhanced structural bond between sandwich core panel 67 and sandwich panel skins, which is provided by the pleated mats 37 between strips of core material, makes this embodiment of FIG. 7 useful in sandwich panels having non-reinforced cores, for example cores of balsa wood or PVC or other engineered foam. In addition to providing structural attachment to the side surfaces of the balsa or PVC strips, the pleats 68 serve as reinforced structural flange elements of the skins.

Figure 16:
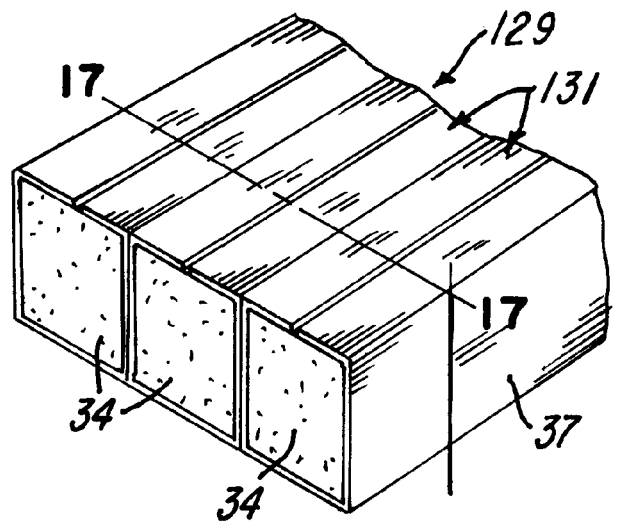
FIG. 16 is a fragmentary perspective view of another core panel constructed in accordance with the invention.
Figure 17:
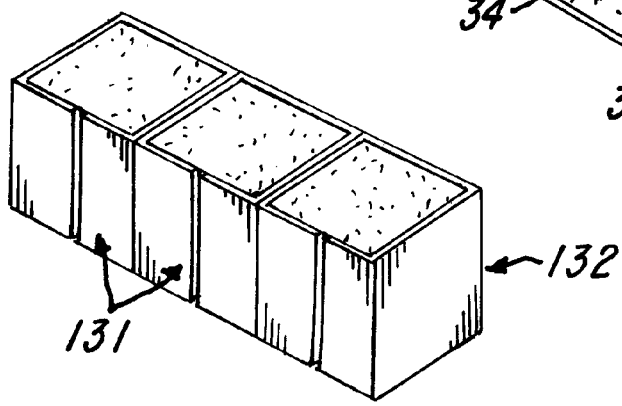
FIG. 17 is a perspective view of a strip cut from the core panel shown in FIG. 16 generally on the line 17-17 of FIG. 16.

Other forms of bi-directional reinforced strips may be substituted for strips 63 shown in FIG. 7. FIG. 16 illustrates reinforced core panel 129 comprising a plurality of adhesively connected elongated strips 131 each of which comprises an elongated foam strip 34 and a fibrous reinforcing mat or fabric 37 which is wrapped around and adhesively attached to each strip 34. Core panel 129 may be cut transversely to form elongated reinforced strips 132 shown in FIG. 17, and strips 132 may be substituted for reinforced strips 63 shown in FIGS. 7 and 8 to form bi-directional core panel 67. Structural properties of core panel 129 and reinforced strip 132 may be modified by wrapping reinforcing mat 37 only partially around the perimeter of foam strip 34 or by extending the wrap so that mat 37 overlaps itself. Prior to being cut into strips 131, core panel 129, as shown in FIG. 16, provides substantial unidirectional properties and strong attachment to sandwich panel skins.

In another preferred embodiment of the invention, reinforced strip 132 may be wrapped transversely with reinforcing mat 37, and a plurality of the wrapped strips 132 are adhesively connected together to form a bi-directional core panel comprising foam blocks each wrapped on all six sides with reinforcing mat. All or alternating strips 132 may be rotated ninety degrees prior to being adhesively connected, depending upon desired structural properties.

Figure 8:
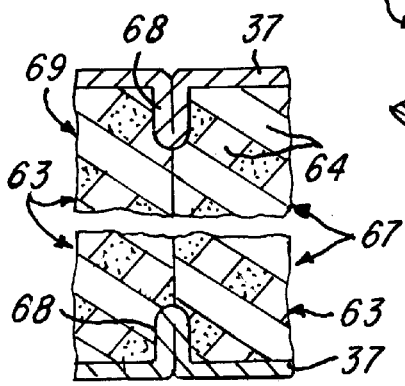
FIG. 8 is an enlarged fragmentary section taken on the line 8-8 of FIG. 7.

Forms of enhanced skin-to-core attachment shown in FIGS. 7 and 8 may also be applied to core panels having only uni-directional reinforcements. FIG. 14 illustrates core panel 120 comprising foam strips 34 separated by planar reinforcing webs 113 which terminate adjacent opposite faces of the strips. Mats 37 have double wall pleats 68 which extend between foam strips 34 adjacent reinforcing webs 113 to connect webs 113 and panel skins as described in connection with FIG. 7. If desired, core panel 120 shown in FIG. 14 may be cut into reinforced strips 121 shown in FIG. 15, and strips 121 may be processed through production apparatus 30 shown in FIG. 1 to produce a further embodiment of bi-directional core panel.

FIGS. 12 and 13 illustrate apparatus 110 for producing core panel 120 shown in FIG. 14. Apparatus 110 comprises reciprocating strip advance ram 38, means (not shown) for applying adhesive resin to strips 34, and press platens 39. Low density foam strips 34 are provided with adhesively connected webs or strips 113 of fibrous and porous reinforcement material, for example fiberglass mat, to which adhesive resin 33 is applied. Resin 33 may be applied to the entire face of each reinforcement strip 113 or to selected portions only. If the portions of reinforcing strips 113 adjacent pleats 68 are to selected portions only. If the portions of reinforcing strips 113 adjacent pleats 68 are free of resin, pleats 68 may be subsequently opened to permit core panel 120 to be bent to match the contours of a curved mold. Strips 34 are inserted transversely between press platens 39 (FIG. 13) by reciprocating ram 38 or other means. Continuous sheets of reinforcing mat 37 or other flexible material are drawn between platens 39 by advancing strip 34, and portions 114 of mat 37 buckle and fold between opposing faces of strips 34 to form the pleats 68. The depth of pleats 68 is determined by the length of mat portions 114, which can be set to provide that pleats 68 extend either partially or entirely through the thickness of core panel 120. Pleats 68 extending partially through the core panel are illustrated in connection with FIG. 12. Pleats 83 extending entirely through the core panel are illustrated in FIG. 9. Either thermoset or thermoplastic resins and resin hardening processes may be used, as previously described in connection with FIG. 1. Core panel 120 (FIG. 14) may be cut to desired length or may be continuously spooled onto reels for delivery to a molding apparatus. The width of core panel 120 is limited by the width of production apparatus 110.

Figure 19:
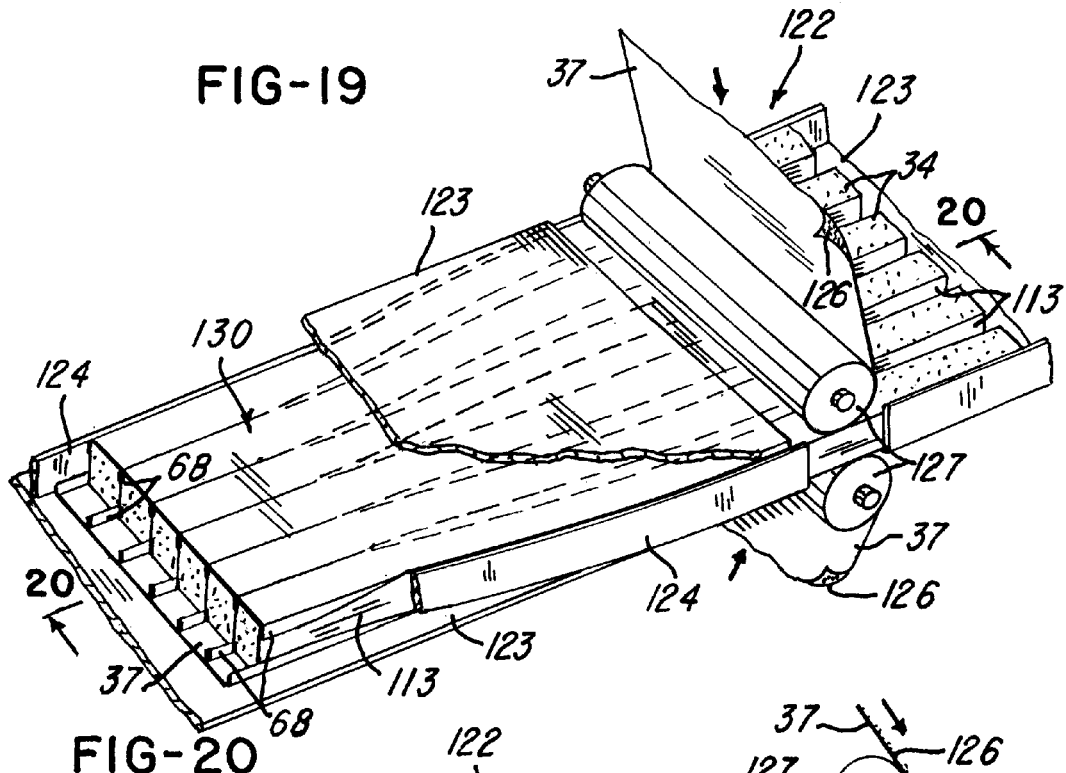
FIG. 19 is a perspective diagrammatic view of another apparatus for producing a composite core panel in accordance with the invention.
Figure 20:
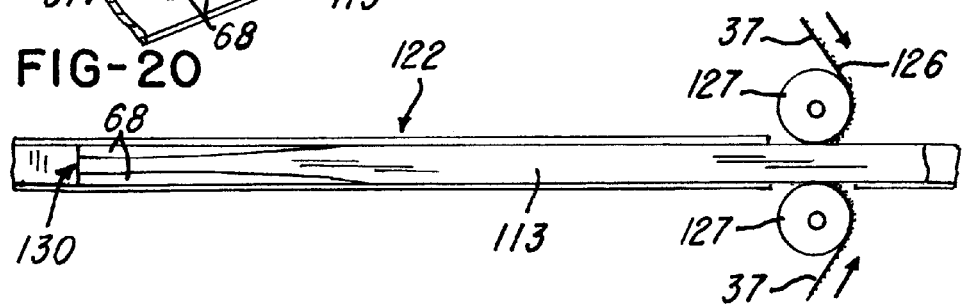
FIG. 20 is a section of the apparatus taken generally on the line 20-20 of FIG. 19.
Figure 21:
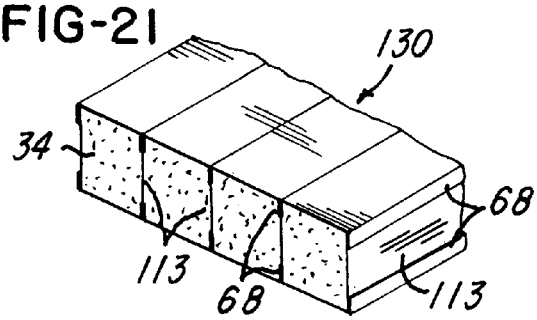
FIG. 21 is an enlarged fragmentary perspective view of the core panel produced on the apparatus shown in FIGS. 19 and 20.

Core panels comprising low density foam strips which extend longitudinally rather than transversely may be produced as shown in FIGS. 19 and 20. Production apparatus 122 comprises upper and lower platens 123, converging side rails 124, and opposing drive rolls 127 or other means for advancing foam strips 34 longitudinally and continuously through the apparatus. A plurality of transversely spaced-apart foam strips 34 having pre-attached reinforcing strips 113 are advanced longitudinally through the apparatus by rolls 127 or other means. Continuous fibrous mats 37 or other flexible webs or sheets of reinforcing material are connected to opposite faces of strips 34 by adhesive layers 126 on the mats and extend across the spaces between the strips 34. As strips 34 advance through apparatus 122 between converging side rails 124, the portions of flexible mats 37 which extend between strips 34 buckle inwardly between the strips 34 to form pleats 68. Adhesive layers 126 bond mats 37 to foam strips 34 and penetrate pleats 68 to form reinforced core panel 130 illustrated in FIG. 21.

As mentioned above, FIGS. 9-11 illustrate additional embodiments of core panels constructed in accordance with the present invention and comprising foam strips and continuous reinforcing sheets or mats. Referring to FIG. 9, reinforced core panel 80 comprises plastics foam strips 34, pleated reinforcing mat or fabric 37, and non-pleated mat or fabric 82. Pleated portions or double wall pleats 83 of mat 37 extend through the thickness of the core panel as structural reinforcing webs and terminate adjacent non-folded mat 82. In FIG. 10, core panel 86 comprises plastics foam strips 34 and continuous reinforcing web or mat 37 having pleated web portions or double wall pleats 88 with folded flange or end portions 89. End portions 89 terminate adjacent web portions 88. Core panel 93 shown in FIG. 11 provides a high ratio of structural web reinforcement to total reinforcing mat cost and weight. Reinforcing mats 37 which form the faces or side surfaces of core panel 93 have double wall portions which extend through the thickness of core panel 93 to form double wall pleats 83, which overlap and form structural webs 95. Preferably pleated web portions or pleats 83 extend to opposing faces of core panel 93 as shown. Core panel 93 is produced by providing apparatus 30, shown in FIG. 1, with a second reciprocating tucker blade 45 which inserts portions of a second reinforcing sheet 37 to form the double wall pleats 83, but from the opposite side of core panel 41.

Any of the core panel embodiments shown in FIGS. 9-11 may be cut transversely to form reinforced strips comprising foam blocks and continuous reinforcing mats, as described above in connection with FIGS. 2-4, and the reinforced strips may be incorporated into bi-directional core panels as described in connection with FIG. 5. Alternately, any of the reinforced strips may be overwound with helically extending rovings as described in connection with FIGS. 12-13 of above-mentioned U.S. Pat. No. 6,740,381.

Strips cut from other reinforced foam core panels may be similarly arranged in alternately-rotated or non-rotated alignment to provide core panels having a wide variety of desired structural properties. Examples include foam strips 63 having helically wound reinforcements as shown in FIG. 6, and strips cut from the mat-reinforced core panels shown in FIGS. 10, 11, 15 and 17.

While the method and forms of core panels herein described constitutes preferred embodiments of the invention, it is to be understood that the invention is not limited to the precise methods and forms of core panels described, and that changes may be made therein without departing from the scope and spirit of the invention as defined in the appended claims.

What is claimed is:

1. A composite panel having an upper surface and a lower surface comprising:
   a plurality of elongated strips of low density cellular material arranged in laterally adjacent relation to form a core panel with the strips having first side surfaces facing the upper surface of the panel, opposite second side surfaces facing the lower surface of the panel, and opposing faces between adjacent elongated strips, wherein each of said elongated strips comprises a series of laterally adjacent blocks, with reinforcing strips of a first continuous flexible fibrous sheet material continuously and completely covering one side surface of the elongated strips forming a first set of double wall pleats between the adjacent blocks and extending at least partially through said thickness of the elongated strips,
   an additional continuous flexible sheet of fibrous and porous reinforcing material continuously overlying the first side surfaces of said elongated strips, the additional flexible sheet having parallel spaced portions projecting between the adjacent elongated strips and forming a second set of double wall pleats between the opposing faces of the adjacent elongated strips, the second set of double wall pleats extending at least partially through the thickness of the core panel as defined by the opposite side surfaces of the elongated strips, and
   an adhesive resin attaching the reinforcing strips, the additional flexible material sheet to the elongated strips, the first set of double wall pleats and the second set of double wall pleats cooperating to reinforce said core panel in two directions.

2. A panel as defined in claim 1 wherein the second set of double wall pleats extend completely through said thickness of the core panel.

3. A panel as defined in claim 2 wherein the second set of double wall pleats have integrally connected end portions forming double wall flanges overlying the second surfaces of said elongated strips.

4. A panel as defined in claim 1 wherein the first set of double wall pleats between the adjacent blocks in each of the elongated strips of blocks extend completely through said thickness of the elongated strips and have integrally connected double wall end portions forming laterally projecting flanges overlying the adjacent blocks.

5. A panel as defined in claim 1 wherein each of the laterally adjacent blocks within the elongated strips has four faces extending between the opposing first and second side surfaces of said elongated strips and comprises a fibrous and porous reinforcing material covering all of the faces of the blocks.

6. A composite panel having an upper surface and a lower surface comprising:
   a plurality of elongated strips of low density cellular material arranged in laterally adjacent relation to form a core panel with the strips having first side surfaces facing the upper surface of the panel and opposite second side surfaces facing the lower surface of the panel and with adjacent elongated strips having opposing faces, wherein each of said elongated strips comprises a series of laterally adjacent blocks, with reinforcing strips of a continuous flexible fibrous material continuously and completely covering one side surface of the elongated strips forming a first set of double wall pleats between the adjacent blocks and extending at least partially through said thickness of the elongated strips,
   a first continuous flexible sheet of fibrous and porous reinforcing material continuously overlying the first side surfaces of the elongated strips, the first flexible sheet having parallel spaced portions projecting between the adjacent elongated strips and forming a first set of double wall pleats between the opposing faces of the adjacent elongated strips,
   a second continuous flexible sheet of fibrous and porous reinforcing material continuously covering the second side surfaces of the strips, the second flexible sheet having parallel spaced portions projecting between the adjacent elongated strips and forming a second set of double wall pleats between the opposing faces of the adjacent elongated strips,
   the first set of double wall pleats extend at least partially through the thickness of the core panel as defined by the opposite side surfaces of the elongated strips, the second set of double wall pleats extend completely through said thickness of the core panel, and the second set of double wall pleats have integrally connected end portions forming double wall flanges overlying the second surfaces of the elongated strips.
   an adhesive resin attaching the reinforcing strips, the first sheet, the second sheet to the elongated strips, and the second set of double wall pleats is to the first set of double wall pleats extending between the opposing faces of the elongated strips.

7. A panel as defined in claim 6 wherein the first set of double wall pleats and the second set of double wall pleats extend completely through said thickness of the core panel.

8. A panel as defined in claim 6 wherein the first set of double wall pleats have integrally connected end portions forming double wall flanges overlying the first surfaces of said elongated strips.

* * * * *